June 19, 1951     C. H. SCHMIDGALL     2,557,394
BRICK FORK
Filed Aug. 18, 1947
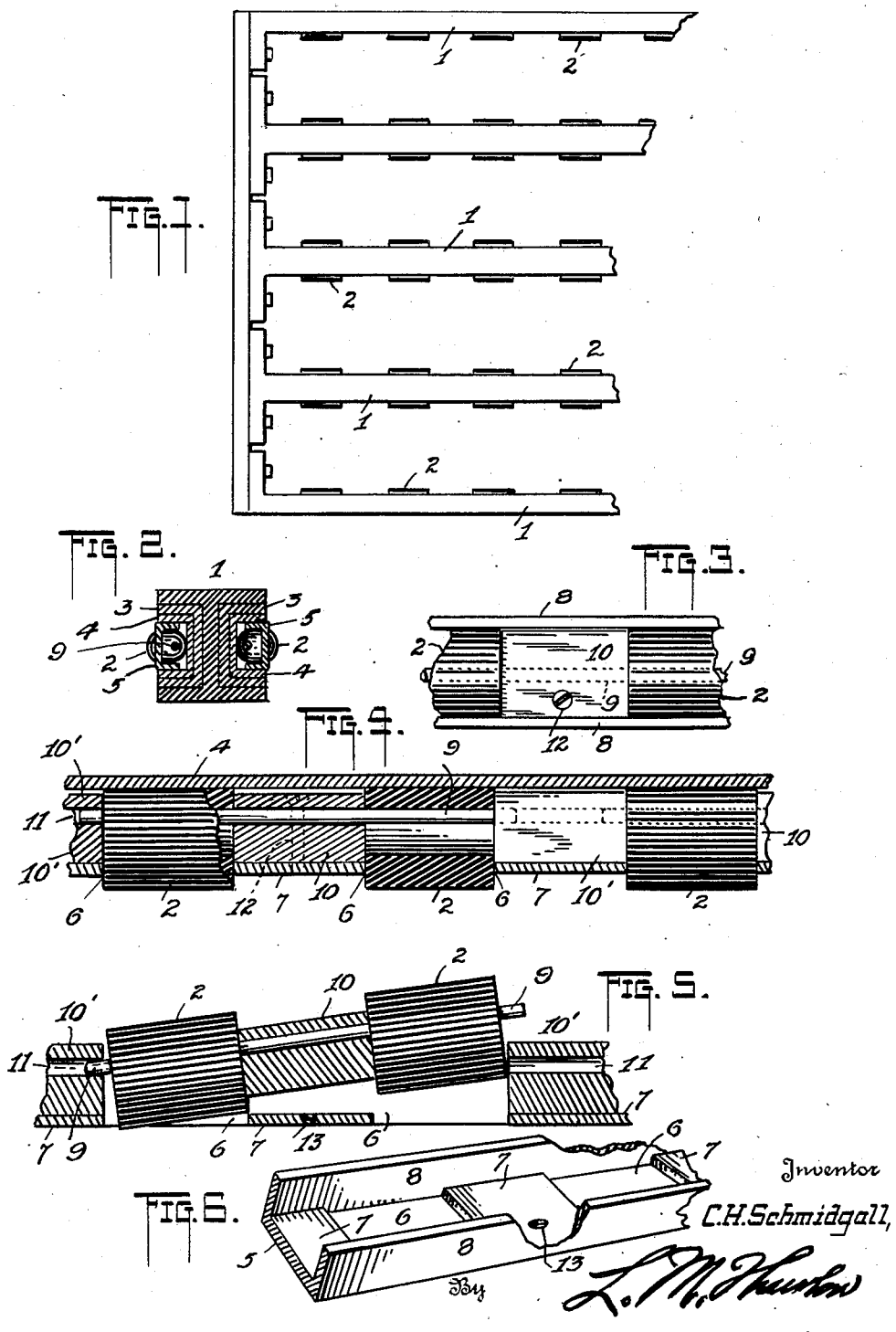
Inventor
C. H. Schmidgall,
By
Attorney Patented June 19, 1951

2,557,394

UNITED STATES PATENT OFFICE 2,557,394

BRICK FORK

Carl H. Schmidgall, Peoria, Ill.

Application August 18, 1947, Serial No. 769,297

6 Claims. (Cl. 294—63)

This invention pertains to that class of machines known as "Brick Forks."

More particularly, the present invention is directed to improvements in the structure of the fork itself which is part of such machines, which fork serves to engage and lift from the ground the bricks and other commodity to be handled.

The object herein is to simplify the structure used in the tines of the fork by which worn gripping members may be quickly and readily removed and replaced by new ones without requiring the disassembling of the tine parts as a whole.

That the invention may be understood in all its parts reference is had to the accompanying drawing forming part thereof.

Figure 1 of said drawing is a plan of a fork to which the present invention applies.

Figure 2 is a transverse section of one of the tines of the fork.

Figure 3 is a plan of parts of the tine structure.

Figure 4 is a longitudinal section of parts of the improved structure as seen in elevation, and in part section.

Figure 5 is a longitudinal section in part sections of parts shown in Figure 4 illustrating the manner of inserting gripper members.

Figure 6 shows part of a member in perspective in which to secure parts of the structure herein to be described.

As is known, in or upon the tine of a fork are mounted certain spaced grippers used for frictionally engaging the load to be lifted, a series of such grippers being carried by each tine of a pair of tines the two series being forced toward each other by power means to provide load gripping action.

So far as is known, each series of grippers of a tine are held in operative position by a single member and when a gripper becomes worn after long use it has been necessary to disassemble the entire tine mechanism in order to provide for a replacement.

The purpose herein is that of providing a structure by which grippers of a tine may be removed and replaced by a simple procedure, as occasion may demand, and without work stoppage for long periods as heretofore.

In the figures the numeral 1 denotes any one of the tines of a fork, while 2 in Figure 1 indicate the grippers projecting from adjacent sides of said tines.

In the present instance the tines 1, as to the intermediate ones, are H-form in cross section, thereby providing channels as illustrated in Figure 2, the outer tines being of U form providing single channel member not shown in structure.

Though not entering into the present invention, but comprised in the general structure, are channel members 3 and 4, in Figure 2, that nest in each other and are jointly seated in channels of the members 1. Lying within the member 4 is a third member 5, said member 5 being involved in the present improvement. This member is shown, in part, in Figure 6 and is of general channel form while having openings 6, in what may be termed the bottom wall thereof, leaving bridging parts 7 connecting the side walls 8, said member 5 as shown in Figure 2 lying within the channel member 4 and having an inverted position with respect to the same in that free edges of the wall members 8 face the bottom of said member 4.

In Figure 4 the member 5 is shown in a position adjacent the bottom wall of the channel member 4, as its position in use, though said wall is not shown in the later figures.

Figure 4, and Figure 5 particularly, each show an assembled structure consisting of a rod 9 which extends through a block 10, said block lying midway of the length thereof. Carried by the rod at each side of the block is a gripper 2 consisting of a somewhat yieldable composition including rubber, for example, as a part thereof, this being of tubular form in this instance as Figure 2 indicates, and this being shown also in Figure 4 in longitudinal section, these gripper members normally abutting said block 10.

Fixed upon each of two of the named bridging parts 7 of the member 5 is an abutment member 10' having a bore 11 paralleling the longitudinal measurement of said member 5.

It is observed that the named rod 9 projects at each end from the grippers 2 and being thus exposed may enter the bores 11 in the following named procedure, it first being noted, however, that, as in Figure 4, the overall length of the combined members 2 and 10 is substantially equal to the distance between the named abutment members 10', the rod thus being of a length of measurement greater than the distance mentioned.

In Figure 5 the manner of seating the gripper structure is shown, an end of the rod being inserted, necessarily in an angular position, into the bore of one of the abutments 10', and the rod being fixed relative to the block 10 so that said rod may be under control during such insertion. By compressing the gripper endwise between the abutment and said block, while also compressing the companion gripper the assembly may be lowered into the member 5, the compression act permitting the rod to enter the bore 11 far enough to allow the opposite end of said rod to pass over the surface of the other abutment 10' whereupon by forcing the assembly downward the last named rod-end will engage in the bore of the said opposite abutment.

The grippers at this time assume their normal forms and lengths and thereby the rod has substantial engagement with both abutments 10' to thus fix said assembly in a secure position. Naturally, the diameters of the bores 11 should be of such that the rod in its angular position during insertion may be readily permitted free entrance thereinto. After any such replacement of grippers has been made the member 5 is seated in place in the channel member 4, Figure 2, the entire act consuming but a short period of time. Previous to this, however, a screw 12, or other suitable fastening means, serves to fix the grippers in secure position by passing through the block 10 into a bridging part 7 directly beneath it at 13 for example. The before mentioned openings 6 between the part 7 receive into them the grippers, these members extending therefrom as in Figure 4, in position to engage the work to be gripped. The channel member 4, by means not necessary to show, forces the member 3 and the grippers 2 in the work gripping direction. While not shown other grippers may be held in the member 5 at each side of the abutments 10' and are insertable in the manner already described.

It is thus seen that any gripper unit or any series of the same may be replaced without the complete disassembling of the tine mechanism heretofore necessary, in some instances at least, in order to replace but a part only of a series of parts.

It is clear that any gripper assembly of an entire series thereof carried by the member 3 may be readily removed without the disruption of the balance thereof.

I claim:

1. In combination with a member for support on the tine of a brick handling fork, said member having thereon a pair of spaced abutments fixed relatively, a gripper assembly as part of a series thereof adapted to lie between the abutments, said assembly including a rod greater in length than the distance between the said abutments, the latter each having a recess therein, the recesses opening toward each other into the space between the abutments, a block mounted on the rod between its ends, and a compressible gripper on the rod at each side of said block, the grippers adapted when compressed in the direction of the length of the rod to permit the latter to be engaged in both the named recesses fixing the assembly in respect to said abutments.

2. In combination with a member for support on the tine of a brick handling fork, said member having thereon a pair of spaced abutments, fixed relatively, a gripper assembly as part of a series thereof adapted to lie between the abutments, said assembly including a rod greater in length than the distance between the said abutments, the latter each having a recess therein, the recesses opening toward each other into the space between the abutments, a block mounted on the rod between its ends, and a compressible gripper on the rod at each side of said block, the gripper adapted when compressed in the direction of the length of the rod to permit the latter to be engaged in both the named recesses fixing the assembly in respect to said abutments, and means to secure the block to said member.

3. In combination with a member for support on the tine of a brick handling fork, said member having thereon a plurality of spaced abutments with recesses in said abutments, a gripper assembly as a part of a series thereof adapted to lie between the abutments, said assembly including a block mounted on the member between the abutments, means for detachably securing the block to said member, a rod mounted on the block and extending into the recess of at least one of the abutments, and a compressible tubular gripper carried on the rod between said block and said abutment.

4. The combination, with a tine of a brick handling fork, of a relatively long channel member extending longitudinally of said tine, said channel member having a plurality of openings in its bottom wall at points spaced apart from each other; a plurality of detachable blocks within said channel member and detachably secured between said openings, and a series of short rods mounted on said blocks and extending across said openings within the channel, together with compressible tubular gripper members on said rods and projecting through the openings in the bottom wall of the channel.

5. The combination, with a tine of a brick handling fork, of a relatively long channel member extending longitudinally of said tine, said channel member having a plurality of openings in its bottom wall at points spaced apart from each other; a series of short rods mounted in said channel and extending across said openings within the bottom wall of the channel, and compressible tubular gripper members on said rods and projecting through the openings in the bottom wall of the channel.

6. The combination, with a tine of a brick handling fork, of a relatively long channel member extending longitudinally of said tine, said channel member having a plurality of openings in its bottom wall at points spaced apart from each other; a plurality of compressible tubular gripper members within said channel and projecting through the openings in the bottom wall of the channel, a plurality of detachable blocks within said channel member and detachably secured between said openings, and a series of short rods mounted on said blocks and extending into said gripper members to secure them in position at said openings.

CARL H. SCHMIDGALL.

REFERENCES CITED

The following references are of record in the file of this patent:

UNITED STATES PATENTS

| Number | Name | Date |
|---|---|---|
| 1,039,727 | Gilmartin | Oct. 1, 1912 |
| 2,486,324 | Rike | Oct. 25, 1949 |